(12) United States Patent
Kirstaetter

(10) Patent No.: US 9,702,314 B2
(45) Date of Patent: Jul. 11, 2017

(54) METHOD AND APPARATUS FOR CARRYING OUT A REFERENCE MEASUREMENT ON A SENSOR OF AN INTERNAL COMBUSTION ENGINE

(71) Applicant: Robert Bosch GmbH, Stuttgart (DE)

(72) Inventor: Thomas Kirstaetter, Kirchberg an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 14/462,273

(22) Filed: Aug. 18, 2014

(65) Prior Publication Data

US 2015/0057867 A1 Feb. 26, 2015

(30) Foreign Application Priority Data

Aug. 22, 2013 (DE) .................... 10 2013 216 688

(51) Int. Cl.
*F02D 41/22* (2006.01)
*B60W 20/00* (2016.01)
*F01N 11/00* (2006.01)
*B60W 20/50* (2016.01)
*F02D 41/12* (2006.01)
*B60W 50/02* (2012.01)

(52) U.S. Cl.
CPC .......... *F02D 41/222* (2013.01); *B60W 20/50* (2013.01); *F01N 11/00* (2013.01); *F02D 41/123* (2013.01); *B60W 2050/0215* (2013.01); *F02D 2200/701* (2013.01); *Y10S 903/905* (2013.01)

(58) Field of Classification Search
CPC ...... B60W 20/50; B60W 20/12; B60W 40/06; B60W 30/095–30/0956; F02D 41/04–41/126
See application file for complete search history.

(56) References Cited

U.S. PATENT DOCUMENTS 8,280,582 B2 * 10/2012 Leinung ............. B60W 40/072
180/197

FOREIGN PATENT DOCUMENTS

DE 10 2007 032969 6/2007

OTHER PUBLICATIONS

Peter Braun et al., Guiding Requirements Engineering for Software-Intensive Embedded Systems in the Automotive Industry, Comput. Sci. Res. Dev. (2014) 29:21-43.*

(Continued)

*Primary Examiner* — Jerrah Edwards
(74) *Attorney, Agent, or Firm* — Norton Rose Fulbright US LLP; Gerard Messina

(57) ABSTRACT

A method and a corresponding apparatus for carrying out a reference measurement on a sensor of an internal combustion engine of a motor vehicle during an overrun phase of the internal combustion engine, in order to detect measurement errors of the sensor. Provision is made that future overrun phases of the internal combustion engine, and the duration of the overrun phases, are predicted on the basis of route data; and that a reference measurement on the sensor is carried out only when the predicted duration of the overrun phase is long enough to carry out the reference measurement completely. With the method and apparatus presented, the functioning of sensors can be monitored during an overrun phase of a motor vehicle having an internal combustion engine.

20 Claims, 1 Drawing Sheet

(56) References Cited

OTHER PUBLICATIONS

John Platt, How to Get Hired in the Automotive Industry, Special Report: Transportation Electrification, Apr. 2014, http://theinstitute.ieee.org/career-and-education/career-guidance/how-to-get-hired-in-the-automotive-industry.*
Huafeng Yu et al., The Challenge of Interoperability: Model-Based Integration for Automotive Control Software, DAC' 15, Jun. 7-11, 2015, San Francisco, CA, U.S.A.*
David Gelles et al., Complex Car Software Becomes the Weak Spot Under the Hood, The New York Times online, Sep. 26, 2015.*
Marvin Zelkowitz, Education of Software Engineers, Perspectives on the Future of Software Engineering, Springer-Verlag Berlin Heidelberg 2013, pp. 349 to 358.*

* cited by examiner

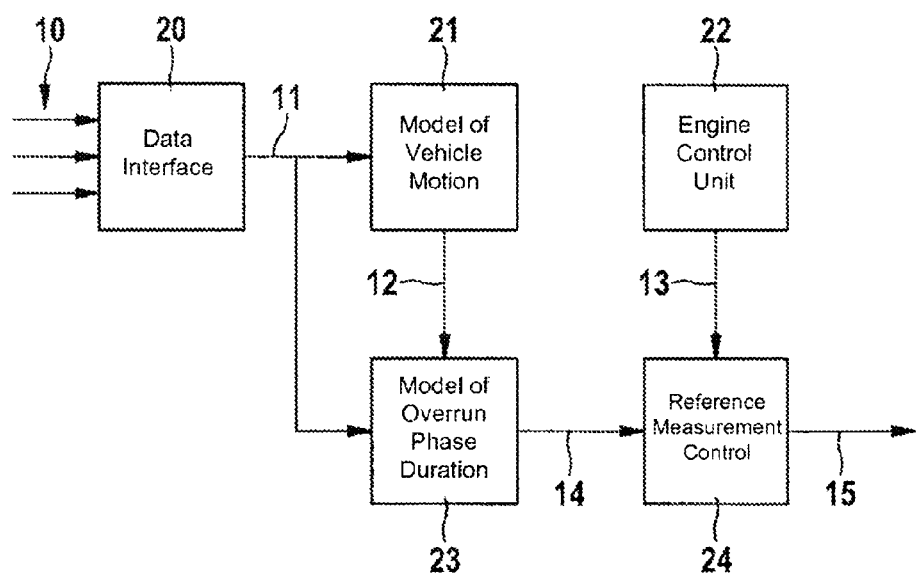

METHOD AND APPARATUS FOR CARRYING OUT A REFERENCE MEASUREMENT ON A SENSOR OF AN INTERNAL COMBUSTION ENGINE

RELATED APPLICATION INFORMATION

The present application claims priority to and the benefit of German patent application no. 10 2013 216 688.5, which was filed in Germany on Aug. 22, 2013, the disclosure of which is incorporated herein by reference.

FIELD OF THE INVENTION

The present invention relates to a method for carrying out a reference measurement on a sensor of an internal combustion engine of a motor vehicle during an overrun phase of the internal combustion engine, in order to detect measurement errors of the sensor. The present invention further relates to an apparatus for carrying out a reference measurement on a sensor of an internal combustion engine of a motor vehicle during an overrun phase of the internal combustion engine, in order to detect measurement errors of the sensor.

A plurality of sensors are used in motor vehicles having internal combustion engines. Some of these sensors must be regularly checked, for example in the context of on-board diagnosis (OBD), as to their functionality. It can be necessary for this purpose for the internal combustion engine to be operated in defined operating states in order to allow the necessary diagnostic functions to be carried out. Regular functional monitoring is necessary in particular for exhaust gas sensors such as those provided for sensing the current state of combustion in the internal combustion engine and for monitoring exhaust gas post-treatment components in the exhaust system of the internal combustion engine. This often requires a reference measurement of fresh air while the internal combustion engine is operating. This calibration measurement usually takes place in the overrun mode of the internal combustion engine. In the overrun mode, the drive train is engaged while no fuel is being delivered to the internal combustion engine, so that fresh air is pumped through the internal combustion engine into the exhaust system.

In the context of new operating strategies for internal combustion engines and new technologies, the operating points of the internal combustion engine that are necessary for monitoring the function of the sensors are no longer experienced sufficiently often. In the case of motor vehicles operated according to the start-stop method, for example, the internal combustion engine is shut off at a standstill, so that the "idle" operating state no longer occurs, or occurs very seldom. With new technologies such as hybrid drive, the overrun mode is very largely suppressed. What is provided here instead of the overrun mode is an operating strategy for energy recovery (regeneration), in which a conversion of kinetic energy into electrical energy occurs. Overrun phases therefore occur only when they are explicitly requested, for example in order to carry out reference measurements on sensors.

A minimum duration of the overrun phase is necessary in order for a reference measurement on sensors to be carried out completely, for example in order to completely purge the exhaust system of the internal combustion engine with air at the position where the corresponding sensor is installed. If the overrun phase is too short, the reference measurement must be interrupted and carried out again at a later point in time. In the case of a hybrid system, the kinetic energy for regeneration is then lost.

The document DE 10 2007 032 969 A1 proposes an apparatus for pre-detecting overrun mode phases (OMP) of a vehicle, the apparatus having at least one processing unit that processes altitude data (AD) of a route (R) being traveled or about to be traveled by the vehicle and, taking the altitude data (AD) into account, calculates a prognosis (P) regarding the prospective occurrence of future overrun mode phases (OMP) of the vehicle. This also allows longer overrun phases to be forecast, so that an operating procedure can be carried out with the lowest possible energy consumption.

SUMMARY OF THE INVENTION

An object of the invention is to furnish a method that enables reference measurements on sensors of internal combustion engines to be carried out completely during an overrun phase of the internal combustion engine.

A further object of the invention is to furnish a corresponding apparatus for carrying out the method.

The object of the invention relating to the method is achieved in that future overrun phases of the internal combustion engine, and the duration of the overrun phases, are predicted on the basis of route data; and that a reference measurement on the sensor is carried out only when the predicted duration of the overrun phase is long enough to carry out the reference measurement completely. If the duration of a possible overrun phase is known, it is possible to evaluate whether it is long enough to carry out a complete reference measurement on a sensor. The reference measurement can also encompass, besides the detection of measurement errors, a calibration of the sensor. Interruption of the reference measurement because of an overrun phase that is too short can thereby be avoided.

An accurate and rapid prediction of route data can be made by the fact that determination of the route data is accomplished with the aid of a navigation system. The method can thereby be implemented economically, since navigation systems nowadays are widespread and are already present in many motor vehicles. Corresponding map data can be utilized in this context.

The duration of an overrun phase can be predicted by taking into account as route data at least the route itself and the topology along the route.

The accuracy of the prognosis can be improved by taking into account, for the prediction of the duration of the overrun phase, data describing the motion of the motor vehicle and/or data describing the state of the motor vehicle.

Provision can be made in particular, for this purpose, that the vehicle speed or the operating point of the internal combustion engine, considered each individually or as a combination of the variables, are taken into account as the data describing the motion of the motor vehicle; and/or that the air resistance or rolling resistance or average weight of the motor vehicle, considered each individually or as a combination of the variables, are taken into account as the data describing the state of the motor vehicle. All these variables have an influence on the duration of an overrun phase and are already present, for example, in an existing engine control system, or can easily be identified and stored. The listing of variables here is not exhaustive and can be supplemented or replaced with further parameters.

According to a variant of the invention, provision can be made that in a first method step, data regarding the route and its topology are collected, processed, and delivered to a general model of the motion of the motor vehicle; that in a second method step the motion and the state of the motor vehicle as it continues to be driven are predicted using the general model; that in a third method step the duration of overrun phases is predicted on the basis of data from the general model and data regarding the route and its topology; and that in a fourth method step an authorization of a reference measurement occurs if the predicted duration of the overrun phase is long enough to carry out the reference completely, or a reference measurement is suppressed if the predicted duration of the overrun phase is not long enough to carry out the reference measurement completely.

In particular for exhaust gas sensors in the exhaust system of internal combustion engines, it is necessary to detect measurement errors brought about by aging phenomena and other influencing factors, and to compensate for such errors as applicable, during an overrun mode in which the exhaust system is being purged with fresh air. Provision can therefore be made that the reference measurement is carried out on an exhaust gas sensor in the exhaust system of the internal combustion engine.

Overrun phases are not provided for in the context of the operation of hybrid vehicles, since kinetic energy is converted into electrical energy and is used to supply energy to the electrical drive system. In order for a reference measurement to be carried out on sensors, overrun phases must therefore be specifically requested as necessary. The result of a reference measurement that is interrupted because an overrun phase is too short is that the kinetic energy is not converted and is therefore lost, but the sensor is not successfully tested.

In order to improve the efficiency of hybrid vehicles, provision can therefore be made that the duration of a possible overrun phase of the internal combustion engine of a hybrid vehicle is determined, and an overrun phase and a reference measurement on a sensor of the hybrid vehicle are authorized if the predicted duration of the overrun phase is long enough to carry out the reference measurement completely, and a reference measurement is suppressed if the predicted duration of the overrun phase is not long enough to carry out the reference measurement completely. The hybrid vehicle is therefore operated in the overrun mode only if a requisite reference measurement on a sensor is necessary and can also be carried out completely. Otherwise the overrun phase and the reference measurement are suppressed, and the energy of motion is converted into electrical energy.

The object of the invention relating to the apparatus can be achieved in that the apparatus contains a first system for furnishing route data; that said first system is connected via an interface to a control unit; that a first program sequence for calculating, based on the route data, the motion and the state of the vehicle as it continues to be driven is stored in the control unit; that a second program sequence for calculating, from the route data and from the data for the motion and the state of the vehicle, the duration of an overrun phase is stored in the control unit; and that a third program sequence for authorizing a reference measurement on the sensor if the predicted duration of the overrun phase is long enough to carry out the reference measurement completely, or for suppressing the reference measurement if the predicted duration of the overrun phase is not long enough to carry out the reference measurement completely, is stored in the control unit. The apparatus thus enables the above-described method to be carried out.

According to a variant embodiment of the invention, provision can be made that the control unit is configured to apply control to an electrical drive system and to the internal combustion engine of a hybrid vehicle; and that the third program sequence is configured to authorize an overrun phase and a reference measurement on the sensor if the predicted duration of the overrun phase is long enough to carry out the reference measurement completely; or that the third program sequence is configured to suppress an overrun phase and a reference measurement on the sensor if the predicted duration of the overrun phase is not long enough to carry out the reference measurement completely. Overrun phases are thus requested only if the reference measurement can be carried out completely. Overrun phases for reference measurements that are interrupted because the overrun phase is too short can be avoided, and the efficiency of the hybrid vehicle can thus be improved.

The method and the apparatus can be used to carry out a reference measurement on an exhaust gas sensor in the exhaust gas conduit of an internal combustion engine. The necessary duration of the overrun phase can be defined so that sufficient purging of the exhaust system with fresh air, as well as the reference measurement itself and a possible calibration of the exhaust gas sensor, can occur.

The method and the apparatus can be utilized in particular in order to carry out a reference measurement on a lambda probe in the exhaust gas conduit of an internal combustion engine.

The method and the apparatus can furthermore be utilized to monitor an exhaust gas sensor in the exhaust gas conduit of an internal combustion engine used in a hybrid vehicle.

The invention will be further explained below with reference to an exemplifying embodiment depicted in the FIGURE.

BRIEF DESCRIPTION OF THE DRAWING

The FIGURE is a block diagram having functional blocks for carrying out a reference measurement on a sensor of an internal combustion engine of a hybrid vehicle.

DETAILED DESCRIPTION

The FIGURE is a block diagram having functional blocks 20, 21, 23, 24 for carrying out a reference measurement on a sensor of an internal combustion engine of a hybrid vehicle. Functional blocks 20, 21, 23, 24 can be distributed, as individual software components, among different electronic systems.

The hybrid vehicle (not depicted) is driven electively via an electric motor or an internal combustion engine. The electric motor can also be operated as a generator, and in the context of a braking operation the vehicle's kinetic energy is converted into electrical energy (regeneration). This electrical energy is stored in a rechargeable battery and later used to supply energy to the electric motor. Regeneration makes a substantial contribution to the efficiency of the hybrid vehicle. Overrun phases, in which the energy of motion of the vehicle is not used for energy recovery, are therefore avoided when possible and are provided only when necessary, for example in order to carry out a reference measurement on an exhaust gas sensor in the exhaust gas conduit of the internal combustion engine.

All available route data 10 are collected and processed in a central instance 20. The data 11 thus obtained flow into a general model 21 of vehicle motion and, together with central parameters 12 obtained from general model 21, into a model 23 for the duration of the overrun phase. A duration 14 of the overrun phase, constituting an output signal of model 23 for the duration of the overrun phase, is conveyed to a logic system 24 for authorizing/requesting a reference measurement. Current operating parameters 13 are also delivered from an engine control unit 22 to logic system 24. The latter outputs an authorization 15 for a reference measurement, and an overrun request.

Route data 10 delivered to central instance 20 contain information about the route and its topology. That information can be obtained from a navigation device, from map data, or via externally available data, e.g. acquired via the Internet. The motion and the state of the motor vehicle are forecast in general model 21 and outputted in the form of central parameters 12 to model 23 for the duration of the overrun phase. The motion of the motor vehicle can be described, for example, by the vehicle speed and the operating point of the internal combustion engine, while the state of the motor vehicle can be represented, for example, by the air resistance, rolling resistance, and average weight of the motor vehicle.

In model 23 for the duration of the overrun phase, a possible duration 14 of an overrun phase is modeled from data 11 from central instance 20 and from central parameters 12. Based on the possible duration 14 of the overrun phase and on further current operating parameters 13 furnished by engine control unit 22, a decision is made in logic system 24 as to whether a reference measurement of the sensor and a corresponding overrun request are authorized or suppressed. An authorization occurs only when the predicted duration 14 of the overrun phase is sufficient to carry out and complete a reference measurement on the sensor. If the predicted duration 14 of the overrun phase is too short, the reference measurement is suppressed. In the context of utilization in a hybrid vehicle as shown in the exemplifying embodiment, the overrun phase is simultaneously also suppressed so that kinetic energy can be used for regeneration into electrical energy.

Thanks to the use of route data, the method and the associated apparatus make it possible to predict the duration of overrun phases and to prevent a request for reference measurements on sensors, in particular on exhaust gas sensors, when there is no prospect for them to be successfully carried out. When used in hybrid vehicles, the request for an overrun phase necessary for the reference measurement is simultaneously suppressed, so that the amount of energy recovered by regeneration, and thus the efficiency of the hybrid vehicle, increase.

Advantageously, a so-called "head unit" of the motor vehicle, which contains a combination instrument, a navigation system, and further components connected thereto, is used to furnish route data 10. It is also possible, however, to provide an interface to a system, for example a smartphone or a server, that furnishes the requisite data. The data regarding the route and the topology are transferred using a suitable protocol, for example via ADASIS, and via a bus system (CAN, FlexRay) present in the motor vehicle, from the head unit or interface to central instance 21, which resides e.g. in engine control unit 22, and are further processed in the request logic system for the reference measurement of the sensors.

What is claimed is:

1. A method for carrying out a reference measurement on a sensor of an internal combustion engine of a motor vehicle during an overrun phase of the internal combustion engine, the sensor requiring a reference measurement having a minimum time duration to ensure operability, the method comprising:
   receiving, by an engine control unit of the motor vehicle, at least one data signal including route data of the motor vehicle, the route data including a route to be traveled by the vehicle and a topology along the route;
   predicting, by the engine control unit, a future overrun phase of the internal combustion engine and a duration of the overrun phase based on the topology of the route to be traveled by the vehicle of the route data;
   generating, by the engine control unit, an authorization signal to control performing of a reference measurement by the sensor conditional upon the predicted duration of the overrun phase being longer than the minimum time duration required to carry out the reference measurement completely; and
   controlling, by the engine control unit, the internal combustion engine and sensor to perform the reference measurement in response to the authorization signal.

2. The method of claim 1, wherein the data signal is received from a navigation system.

3. The method of claim 1, wherein the predicting of the duration of the overrun phase takes into account at least one of: data describing a motion of the motor vehicle, or data describing a state of the motor vehicle.

4. The method of claim 3, wherein the data describing the motion of the motor vehicle includes at least one of: a vehicle speed, or an operating point of the internal combustion engine; and
   the data describing the state of the motor vehicle includes at least one of: an air resistance of the motor vehicle, a rolling resistance of the motor vehicle, or an average weight of the motor vehicle.

5. The method of claim 1, further comprising:
   delivering to a general model of motion of the motor vehicle route data including a route and a topology of the route;
   predicting a motion and state of the motor vehicle as it continues to be driven using the general model;
   predicting the duration of the overrun phase based on data from the general model and data regarding the route and its topology; and
   authorizing the reference measurement upon the predicted duration of the overrun phase being long enough to carry out the reference measurement completely, and suppressing the reference measurement upon the predicted duration of the overrun phase being not long enough to carry out the reference measurement completely.

6. The method of claim 1, wherein the sensor is an exhaust gas sensor in the exhaust system of the internal combustion engine.

7. The method of claim 1, wherein the duration of a possible overrun phase of the internal combustion engine of a hybrid vehicle is determined, and an overrun phase and a reference measurement on a sensor of the hybrid vehicle are authorized if the predicted duration of the overrun phase is long enough to carry out the reference measurement completely, and a reference measurement is suppressed if the predicted duration of the overrun phase is not long enough to carry out the reference measurement completely.

8. An apparatus for carrying out a reference measurement on a sensor of an internal combustion engine of a motor vehicle during an overrun phase of the internal combustion engine, the sensor requiring a reference measurement having a minimum time duration to ensure operability, the apparatus comprising:

an engine control unit to:

receive at least one data signal including route data of the vehicle, the route data including a route to be traveled by the vehicle and a topology along the route;

calculate, based on the route data, a motion and a state of the vehicle;

predict, from the topology of the route to be traveled by the vehicle of the route data and from the data for the motion and the state of the vehicle, a duration of an overrun phase;

generate an authorization signal to authorize a reference measurement on the sensor upon the predicted duration of the overrun phase being longer than the minimum time duration required to carry out the reference measurement completely, and suppress the reference measurement upon the predicted duration of the overrun phase not being longer than the minimum time duration required to carry out the reference measurement completely; and control the internal combustion engine and sensor to perform the reference measurement responsive to the authorization signal.

9. The apparatus of claim 8, wherein the control unit is configured to apply control to an electrical drive system and to the internal combustion engine of a hybrid vehicle; authorize the overrun phase if the predicted duration of the overrun phase is long enough to carry out the reference measurement completely; and suppress the overrun phase if the predicted duration of the overrun phase is not long enough to carry out the reference measurement completely.

10. The apparatus of claim 8, wherein the sensor is an exhaust gas sensor in the exhaust gas conduit of an internal combustion engine.

11. The apparatus of claim 8, wherein the sensor is a lambda probe in the exhaust gas conduit of an internal combustion engine.

12. The apparatus of claim 8, wherein the sensor is an exhaust gas sensor in the exhaust gas conduit of an internal combustion engine used in a hybrid vehicle.

13. The method of claim 1, wherein the sensor is an exhaust gas sensor in the exhaust gas conduit of an internal combustion engine.

14. The method of claim 1, wherein the sensor is a lambda probe in the exhaust gas conduit of an internal combustion engine.

15. The method of claim 1, wherein the sensor is an exhaust gas sensor in the exhaust gas conduit of an internal combustion engine used in a hybrid vehicle.

16. The method of claim 1, wherein the predicting the duration of the overrun phase takes into account data describing motion of the motor vehicle.

17. The method of claim 16, wherein the data describing the motion of the motor vehicle includes at least one of: a vehicle speed, or an operating point of the internal combustion engine.

18. The method of claim 1, wherein the predicting the duration of the overrun phase takes into account data describing a state of the motor vehicle.

19. The method of claim 18, wherein the data describing the state of the motor vehicle includes at least one of: an air resistance of the motor vehicle, a rolling resistance of the motor vehicle, or an average weight of the motor vehicle.

20. The method of claim 1, wherein the engine control unit receives the route data from at least one of: a navigation system of the vehicle, a smart phone, or a server.

* * * * *